United States Patent [19]

Brazelton

[11] 4,203,390
[45] May 20, 1980

[54] AQUATIC EXERCISE FACILITY WITH ISLAND

[75] Inventor: Carl L. Brazelton, Bonfield, Ill.

[73] Assignee: Stran Corporation, Bradley, Ill.

[21] Appl. No.: 914,499

[22] Filed: Jun. 12, 1978

[51] Int. Cl.² ............................................. A01K 15/02
[52] U.S. Cl. ..................................... 119/29; 119/158; 4/172.16
[58] Field of Search ................. 119/29, 158; 4/172.16, 4/172.17, 172

[56] References Cited

U.S. PATENT DOCUMENTS

| | | | |
|---|---|---|---|
| 1,637,423 | 8/1927 | Miller | 4/172.16 |
| 3,691,995 | 9/1972 | Little | 119/29 |
| 3,835,815 | 9/1974 | Matthews | 119/158 |
| 3,916,839 | 11/1975 | Hewes, Jr. | 119/158 |
| 4,052,757 | 10/1977 | Dotson | 4/172.16 |

Primary Examiner—Hugh R. Chamblee
Attorney, Agent, or Firm—Vogel, Dithmar, Stotland, Stratman & Levy

[57] ABSTRACT

An exercise pool for animals having an entry thereto and an exit therefrom with a hollow island mounted centrally thereof and extending upwardly therefrom, a filtering area and a solids pit in the island with a screen disposed therebetween, a skimming gutter at the upper end of the island having an inlet at the surface of the pool of water and an outlet to the solids pit, a pump for pumping water from the pool through the solids pit and the filtering area and back into the pool through the lower portion of the island, water filtering mechanism in the filtering area for filtering the current of water flowing therethrough, water treatment mechanism for treating the water flowing through the island to maintain the chlorine content and the pH thereof within predetermined limits, and a main drain in the lower portion of the island to draw water from the pool and upwardly to the solids pit when the water level within the island falls to a predetermined level; there also is disclosed a self-contained island for mounting in animal exercise pools.

62 Claims, 9 Drawing Figures

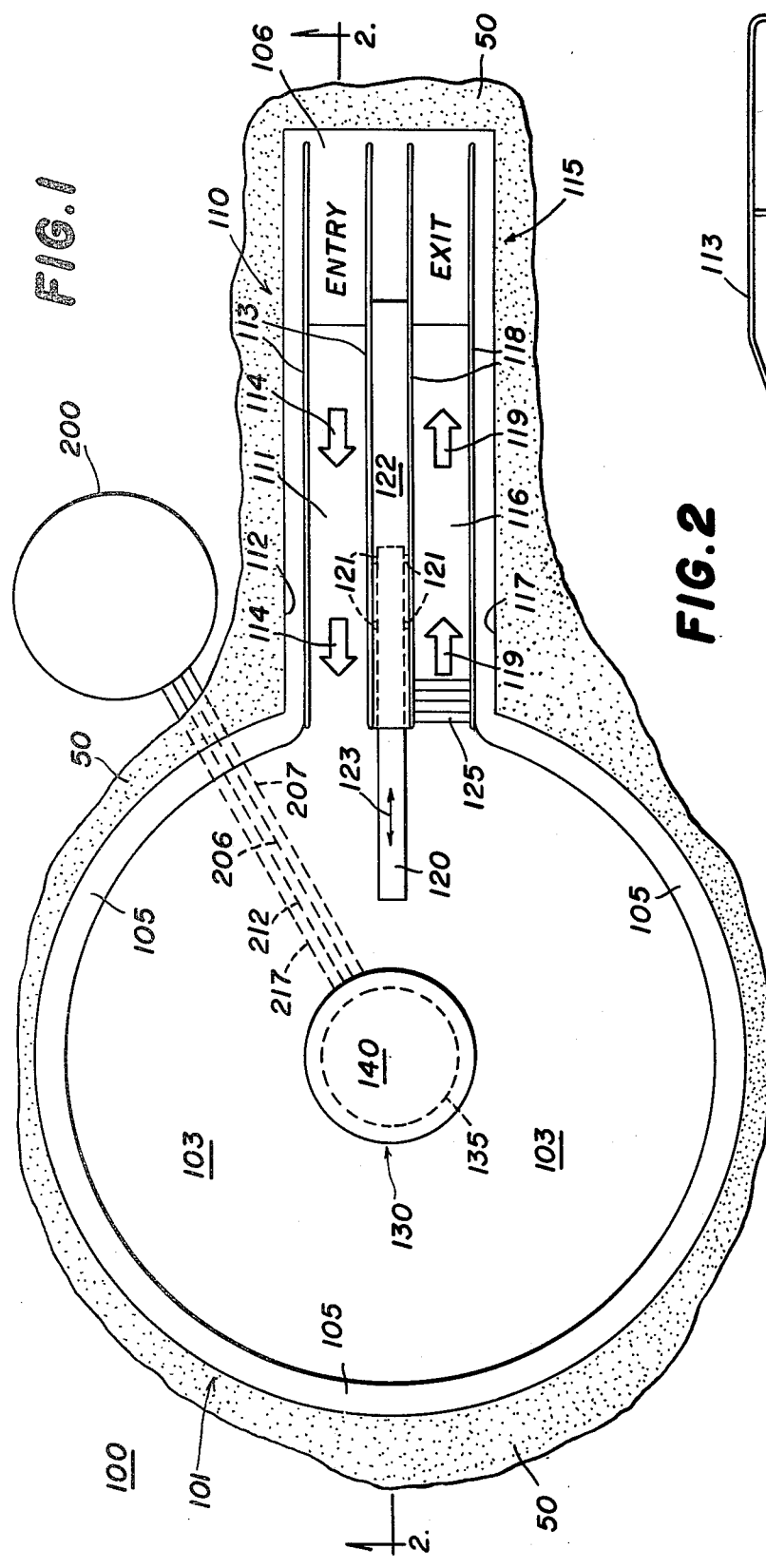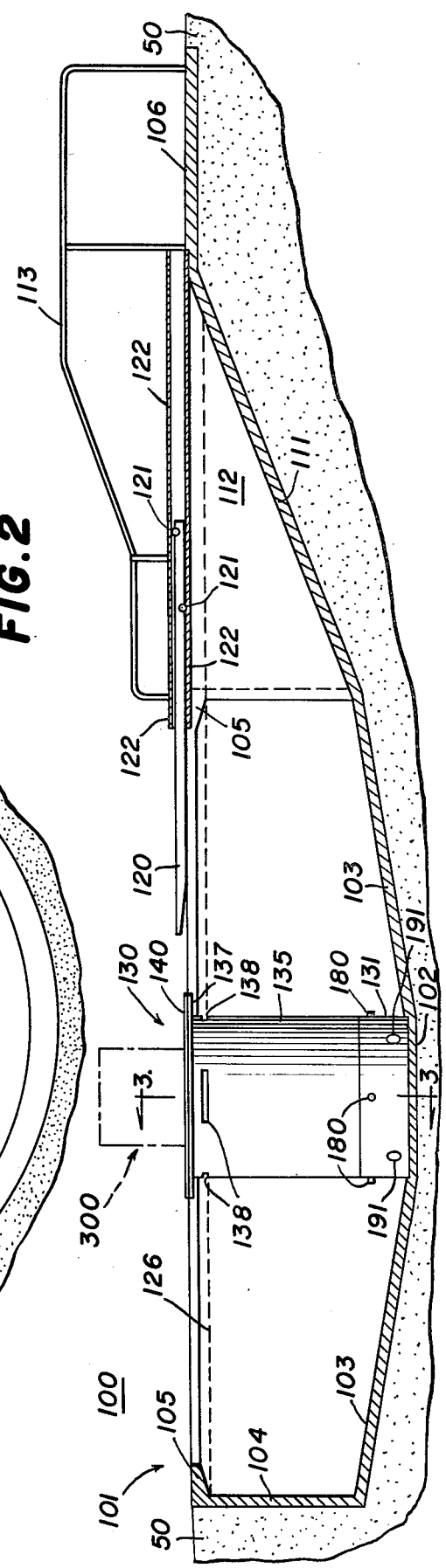

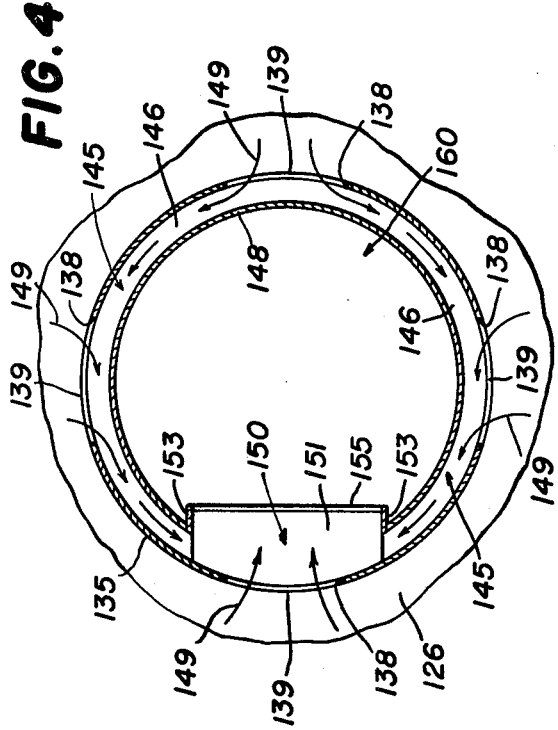
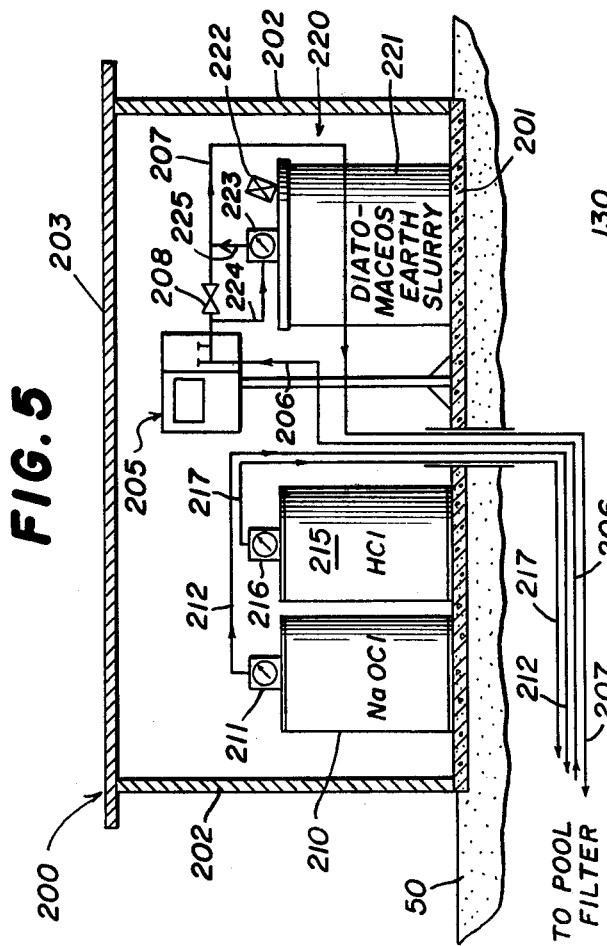
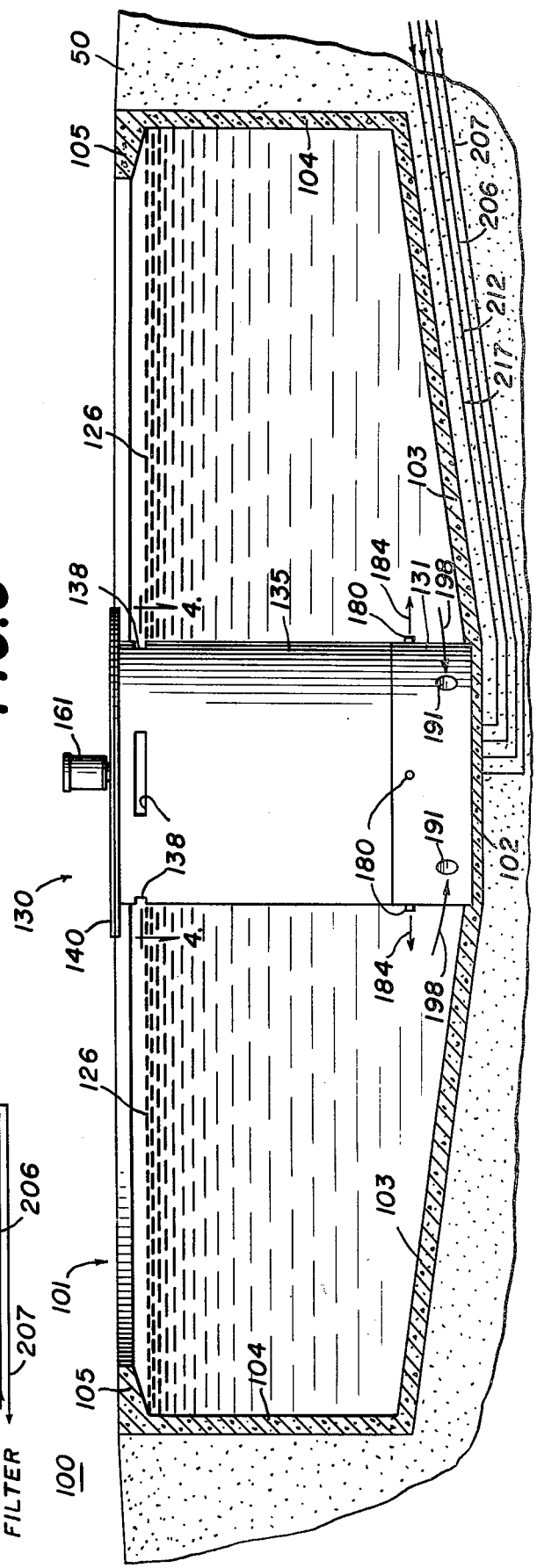

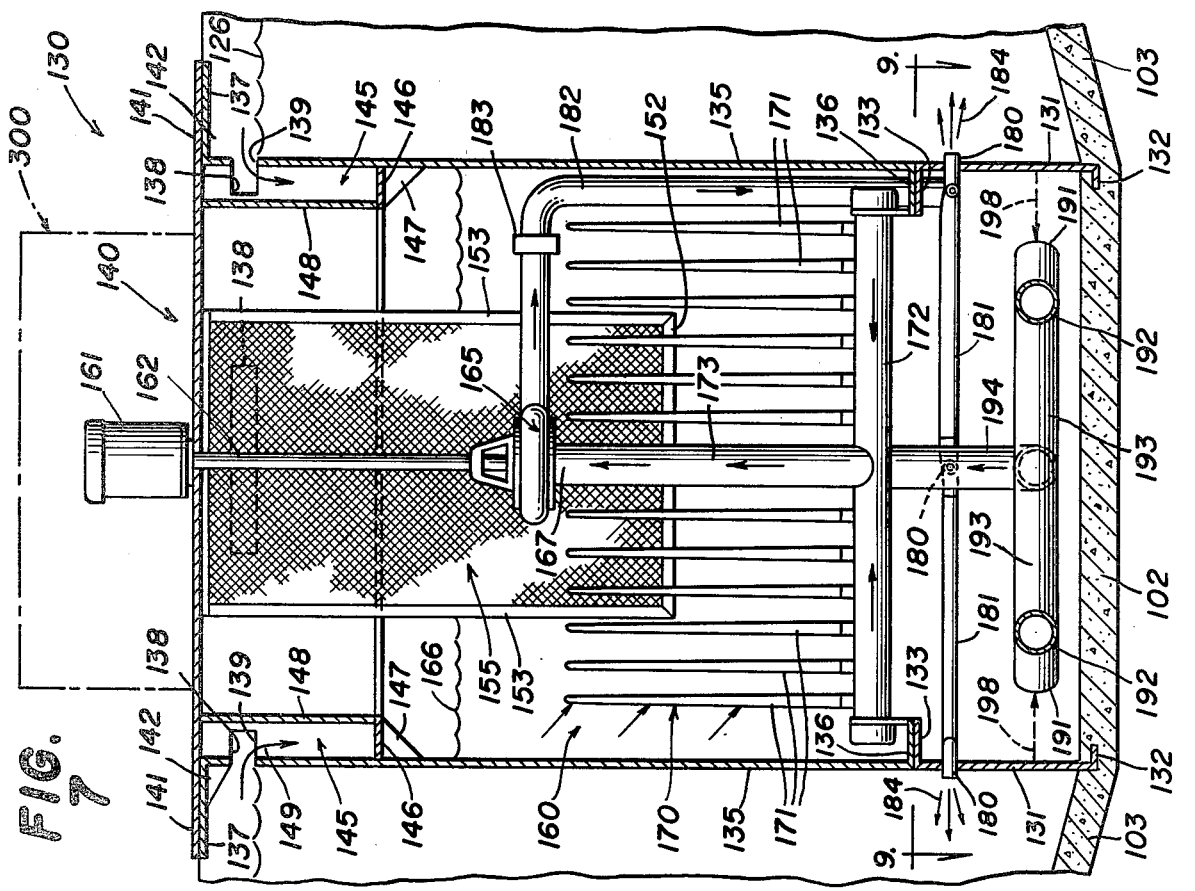
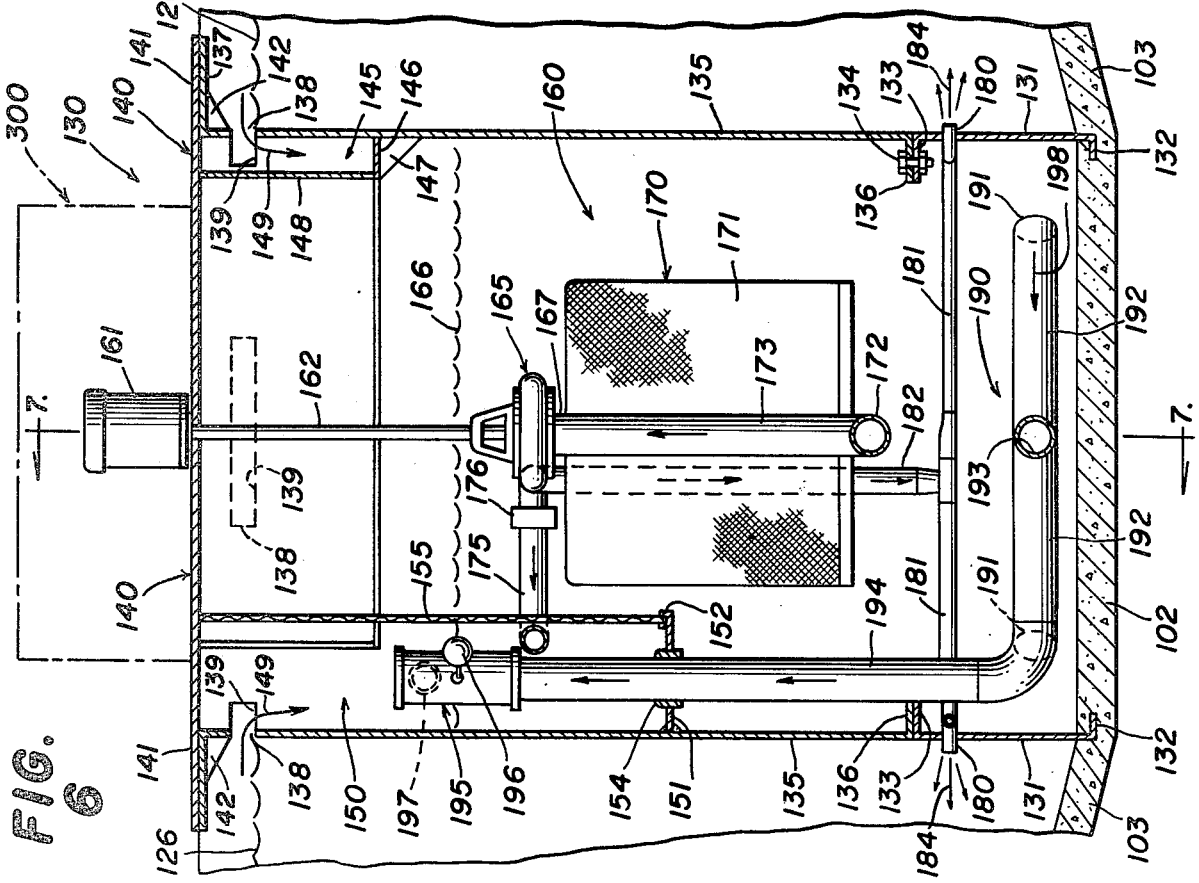

AQUATIC EXERCISE FACILITY WITH ISLAND

PRIOR ART STATEMENT AND BACKGROUND OF THE INVENTION

The present invention relates generally to exercise facilities for animals, and especially to exercise facilities utilizing a pool of water, wherein the pool of water is continually recirculated, filtered and treated.

One form of an exercise pool utilized heretofore is illustrated in U.S. Pat. No. 3,691,995 granted Sept. 19, 1972 to G. M. Little. This patent shows a large swimming pool with an entry ramp and an exit ramp therefor, and having an island disposed centrally thereof with footwalks for trainers to move to the island during the exercise of the animals in the pool. There is no provision for circulating the water within the pool, or for filtering the water within the pool, or for chemically treating the water within the pool. As a result, the water quickly becomes turgid, highly odorous, and generally unsanitary, thus to endanger the health of the animals using the pool and the trainer handling the animal during use of the pool.

SUMMARY OF THE INVENTION

The present invention provides an aquatic exercise facility for animals, such as horses, wherein the water in the pool is continually circulated, filtered, chemically treated, and generally maintained in a hygienic condition, thus protecting the health of the animals using the facility and the handlers of the animals using the facility.

This is accomplished in the present invention, and it is an important object of the present invention to accomplish these desired results, by providing an aquatic exercise facility for animals including a container for a pool of water having an animal entry area and animal exit area, a hollow island mounted in the container generally centrally with respect to the pool of water and extending upwardly therefrom, at least a portion of the pool around the island having a depth sufficient to require an animal to swim therein from the animal entry area to the animal exit area, whereby an animal entering the pool at the animal entry area must swim at least part way around the island across the deep portion into the exit area thus to exercise the animal, means for establishing a current of water flowing from the pool of water into the island and from the island and back into the pool of water, and water filtering mechanism in the island for filtering the current of water flowing through the island thus to clean the water in the pool of water.

Another object of the invention is to provide an aquatic exercise facility of the type set forth having a ramp mounted for movement between an extended position overlying the island and a retracted position spaced from the island.

Yet another object of the invention is to provide an aquatic exercise facility of the type set forth wherein there is provided water treatment mechanism for treating the water flowing through the island to maintain the chlorine content and the pH thereof within predetermined limits.

Still another object of the invention is to provide in an aquatic exercise facility of the type set forth a filtering area in the island and a solids pit in the island adjacent to the upper portion thereof and a screen disposed therebetween, a skimming gutter mounted adjacent to the upper end of the island and having an inlet communicating with the surface of the pool of water and an outlet communicating with the solids pit, means for establishing a current of water flowing from the pool of water through the solids pit and said filtering area and back into the pool of water from the lower portion of the island, and water filtering mechanism in the filtering area for filtering the current of water flowing therethrough thus to clean the water in the pool of water.

Yet another object of the invention is to provide in an aquatic exercise facility of the type set forth a main drain in the lower portion of the island communicating with openings therein to draw water from the pool of water and upwardly to the solids pit when the water level within the island falls to a predetermined level.

Still another object of the invention is to provide a self-contained island for mounting in a pool of water in an aquatic exercise facility for animals, the island containing the equipment to accomplish the water filtering and water treatment set forth hereinabove.

Further features of the invention pertain to the particular arrangement of the parts of the aquatic exercise facility, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 1 is a plan view of a preferred embodiment of an aquatic exercise facility made in accordance with and embodying the principles of the present invention;

FIG. 2 is an enlarged view in vertical section through the facility of FIG. 1 as seen in the direction of the arrows along the line 2—2 thereof;

FIG. 3 is a view in vertical section along the line 3—3 of FIG. 2;

FIG. 4 is a further enlarged view in horizontal section along the line 4—4 of FIG. 3;

FIG. 5 is a view in vertical section partly diagrammatic, of a water treatment equipment room forming a part of the present invention;

FIG. 6 is an enlarged view in vertical section through the island of FIGS. 2 and 3;

FIG. 7 is a view in vertical section along the line 7—7 of FIG. 6;

DESCRIPTION OF THE PREFERRED EMBODIMENTS

Figure 8:
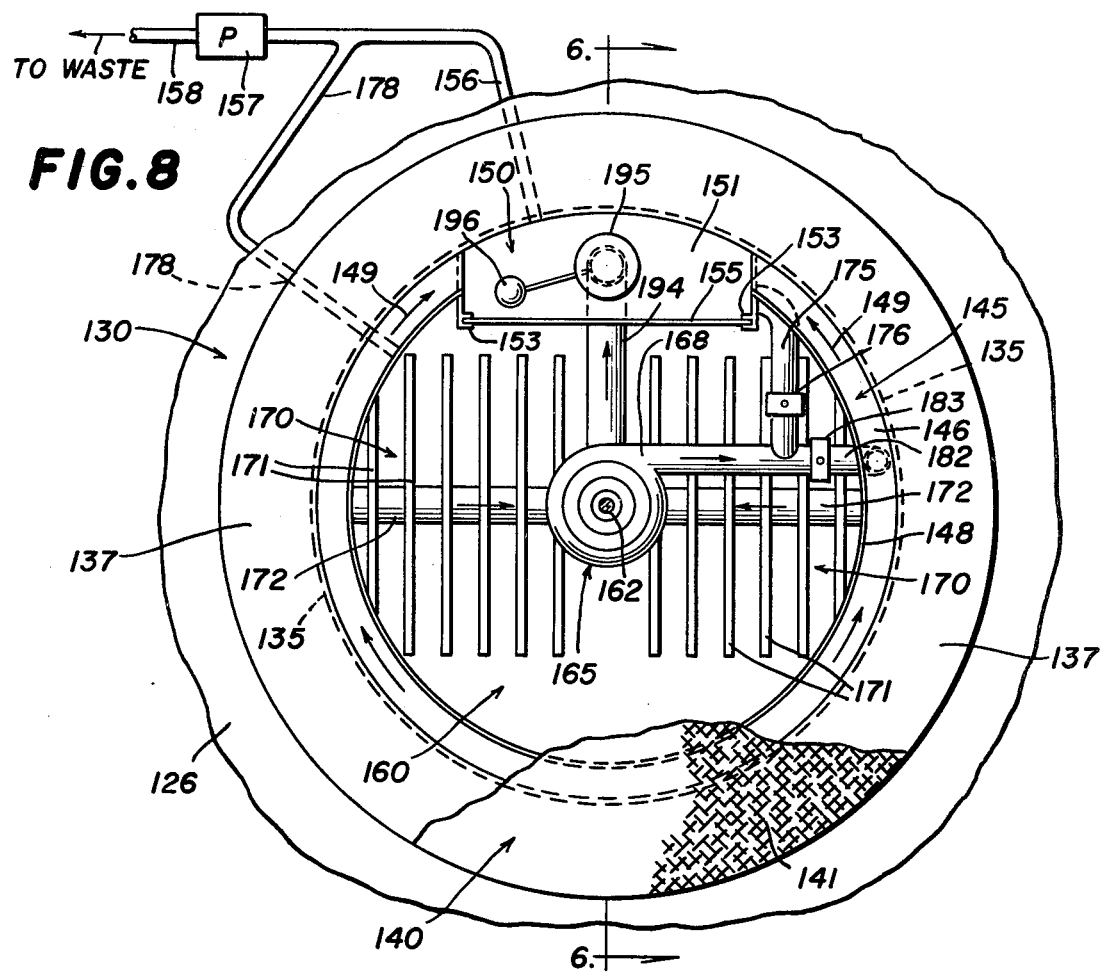
FIG. 8 is a plan view of the parts of FIG. 6 with a portion of the cover removed.

Referring to FIGS. 1 to 3 of the drawings, there is illustrated a first preferred embodiment of an aquatic exercise facility 100 made in accordance with and embodying the principles of the present invention. As illustrated, the facility 100 includes a container 101 for a pool of water, the container 101 being disposed in an excavation in the ground 50 to be supported thereby. The container 101 is illustrated as being formed of concrete, but another preferred material of construction for the container 101 is stainless steel. A central bottom wall 102 essentially circular in form and disposed horizontally is provided centrally of the container 101; extending upwardly therefrom and therearound is a bottom wall 103 that is conical in shape and slopes upwardly to a generally circular side wall 104. For a purpose to be disclosed more fully hereinafter, an inwardly directed abutment 105 extends inwardly from the upper edge of the side wall 104 around the periphery of the container 101. Disposed to the right as viewed in FIGS. 1 and 2 is a concrete deck 106 disposed on the top of the ground 50 and forming an entry way to an animal entry area 110 and an animal exit area 115, as well as a ramp 120 to be used by trainers handling the animals in the exercise facility 100.

The entry area 110 extends between the deck 106 and the container 101 and includes an entry ramp 111 sloping downwardly from the deck 106 to the outer periphery of the conical sloping bottom wall 103. Disposed to the top as viewed in FIG. 1 is a ramp side wall 112, and disposed on either side of the entry ramp 111 are railings 113 that guide the animal down the entry ramp 111. The exit area 115 is immediately adjacent to the entry area 110 and includes an exit ramp 116 extending upwardly from the outer periphery of the sloping bottom wall 103 up to the deck 106. A side wall 117 is disposed to the bottom as viewed in FIG. 1, and there further are provided two spaced-apart railings 118 that guide the animal upwardly along the exit ramp 116. In order to facilitate the climbing of the animal onto the exit ramp 116, steps 125 are provided, four having been illustrated in FIG. 1. By this arrangement, animals, such as horses, can be led down the entry ramp 111 between the railings 113 in the direction of the arrows 114 and into the pool 101, and after swimming around the pool 101, can exit up the exit ramp 116 using the steps 125 between the railings 118 and in the direction of the arrows 119.

A walkway between the adjacent ones of the railings 113 and 118 is provided for the trainer handling the horse or other animal using the facility 100. Instead of sloping downwardly, the trainer's entry is essentially horizontal on support tracks 122 (See FIG. 2), and it further is contemplated that the trainer will move onto an island 130 disposed centrally of the pool 101. In order to gain access to the island 130, there has been provided a movable ramp 120 mounted on rollers 121 supported by the tracks 122, the ramp 120 being longitudinally shiftable in the direction of the arrow 123 between a position extending to the island 130, and a position fully retracted in the support tracks 122 and clearing the pool 101. As is best illustrated in FIGS. 2 and 3, the water in the pool 101 is preferably maintained at approximately the level 126.

In order to filter and clean the water within the pool 101, the island 130 has been provided with a water filtering and purifying mechanism associated therewith. Referring particularly to FIGS. 6 and 7, the island 130 includes a lower housing 131 that is generally circular in shape and formed of metal, the lower end of the housing 131 having an in-turned bottom flange 132 that is set in the bottom wall 102. It will be appreciated that if more convenient, the lower housing 131 can be suitably secured as by bolts or by fasteners to the bottom wall 102, and in the case of a metal container 101, may be also bolted thereto or welded. There is also provided on the upper edge of the cylindrical lower housing 131 and in-turned top flange 133 which receives thereon an upper housing 135, also cylindrical and formed of metal. The upper housing 135 has a bottom flange 136 that is in-turned and rests upon the top flange 133 of the lower housing 131, the flanges 133 and 136 being suitably interconnected as by a plurality of the fasteners 134 (see FIG. 6). The upper end of the upper housing 135 carries an out-turned top flange 137 that supports a cover 140 overlying the upper end of the island 130.

One inlet to the interior of the island 130 is through four skimmer openings 138 disposed just below the upper edge of the upper housing 135, the openings 138 being best illustrated in FIG. 4 of the drawings. Each of the openings 138 has a lower edge 139 that serves as a skimmer weir receiving thereover water from the pool 102 and any debris floating adjacent to the surface thereof. To this end, the lower edges 139 of the openings 138 are at the desired water level 126 so that any floating debris, such as excrement from the animals, will wash over the edges 139 through the openings 138 and into a skimmer gutter 145. Referring also to FIGS. 6 and 7, it will be seen that the skimmer gutter 145 is formed by a bottom wall 146 extending radially inwardly from the upper housing 135 a short distance and carrying on its inner edge an upstanding side wall 148 that extends upwardly to the upper edge of the upper housing 135 and substantially therearound, see FIG. 4 also. The bottom wall 146 is supported by braces 147 so as to provide for mechanical strength of the skimmer gutter 145. Water flows through the openings 138 and into the gutter 145 in the direction of the arrows 149, this flow also carrying with it any debris floating on the surface of the water surrounding the island 130.

Disposed to one side of the island 130 at the upper end thereof and opposite one of the skimmer openings 138 is a solids pit 150 (see FIGS. 4 and 6 particularly). The solids pit 150 is formed by a bottom wall 151 suitably secured to the island upper housing 135, the inner edge of the bottom wall 151 having retaining flanges 152 disposed horizontally and also having upstanding side retaining flanges 153, the retaining flanges 152 and 153 supporting a removable screen 155. The screen 155 serves to separate the solids pit 150 from the remainder of the island 130, the remainder of the island constituting a filtering area generally designated by the numeral 160. The bottom wall 151 has an opening therein receiving a gasket 154 that seals around a pipe extending therethrough to be described more fully hereinafter.

Water entering the openings 138 flows into the skimmer gutter 145 and thence to the solids pit 150. Water then flows from the solids pit 150 through the screen 155 and into the filtering area 160. Any large debris in the water within the solids pit 150 is retained therein by the screen 155, only very small particulate matter having a size less than 0.020 inch passing thrugh the screen 155 and into the filtering area 160. Periodically it is necessary to pump the debris from the solids pit 150, to this end there is provided a pipe 156 communicating therewith and connected to the inlet of a pump 157 which has its outlet connected by a pipe 158 to a waste disposal area (see FIG. 8).

Disposed within the filtering area 160 is a main circulating pump 165 (see FIGS. 6, 7 and 8 particularly), the pump 165 having an inlet 167 and an outlet 168. The pump 165 is driven by a motor 161 mounted on the cover 140 and having a drive shaft 162 extending downwardly to drive the pump 165. It will be noted that the pump 165 is normally submerged in water, the water level within the island 130 typically being at 166. In order to support the motor 161, as well as other equipment that might be mounted on the cover 140, and also to support trainers walking upon the cover 140, reinforcements 142 are provided beneath the top flange 137 on the upper housing 135. Also as may be best seen in FIG. 8, the outer portion of the cover 140 is provided with a roughened surface providing a footwalk 141 to be used by trainers who move to the island across the ramp 120 to assist the animals as they swim around the pool 101.

There further is mounted within the island 130 a vacuum filter 170, which has been illustrated as being of the diatomaceous earth filter aid type. The vacuum filter 170 more particularly includes a plurality of filter cells 171 which provide a substantial filtering area; the water passing through the layer of diatomaceous earth on the surface of the filter cells and into the filter cells is collected in a manifold 172. The manifold 172 is connected by a pipe 173 to the inlet 167 of the circulating pump 165. In this manner, the pump 165 draws water from the filtering area 160 through the filter cells 171, the manifold 172 and the pipe 173.

Figure 9:
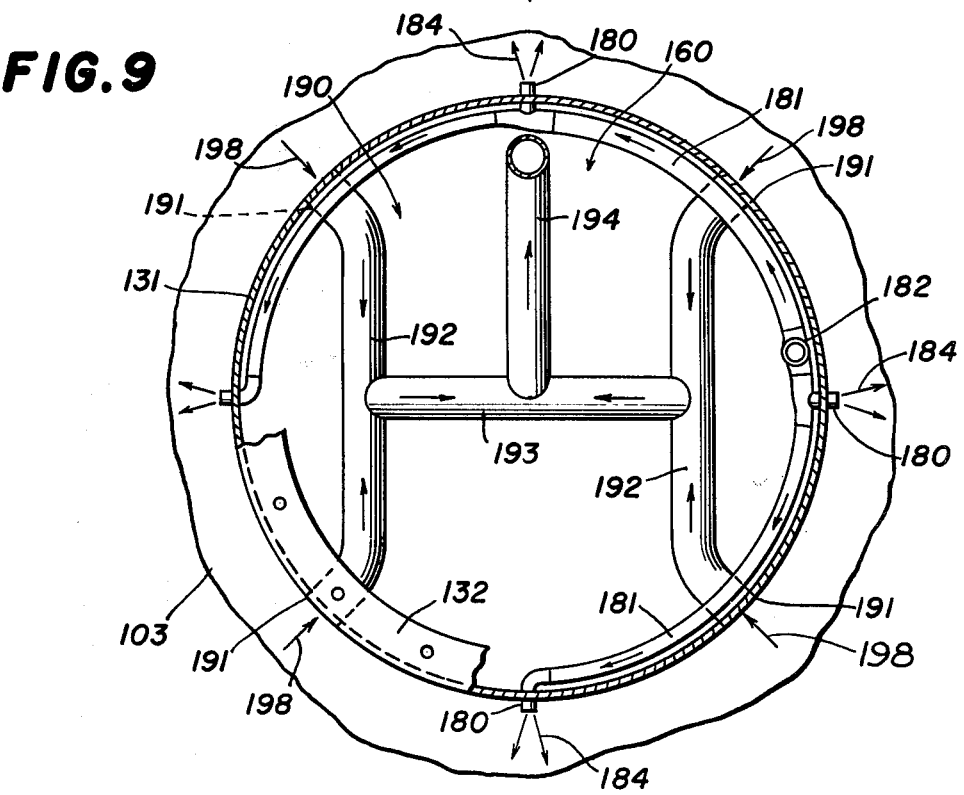
FIG. 9 is a view in horizontal section along the line 9—9 of FIG. 7.

The water thus filtered is returned to the pool 101 through four water jets 180 disposed toward the bottom of the island 130 (see FIGS. 6, 7 and 9 particularly). The water jets 180 are adjustable as to the direction of discharge, and as is illustrated in FIG. 2, discharge laterally outwardly and upwardly along the sloping bottom wall 103 and thus tend to form a current flowing toward the wall 104 which then returns along the upper portion of the pool 101 and toward the skimming weirs 139, the direction of discharge of the filtered water being indicated diagrammatically by the arrows 184.

In order to apply the diatomaceous filter aid to the surfaces of the filter cells 171, a quantity of slurry containing the diatomaceous earth is fed into the island 130 (as will be explained more fully hereinafter) and the circulating pump 165 circulates the slurry through the filter cells 171 until the desired layer of diatomaceous earth has been built up on the outer surfaces of the filter cells 171. In order to provide the necessary recirculation within the island 130, so as not to spread the diatomaceous earth throughout the body of the pool 101, a valve 183 has been provided at the inlet to the pipe 182 so as to prevent the diatomaceous earth slurry from exiting by way of the jets 180. The pump outlet 168 also has connected thereto a precoat pipe 175 through a valve 176, the other end of the pipe 175 being disposed in and in communication with the solids pit 150. When it is desired to apply a new coat of diatomaceous earth filter aid to the filter cells 171, the slurry of diatomaceous earth is introduced into the island 130 and the circulating pump 165 operated with the valve 183 closed and the valve 186 open. As a result, water is drawn through the filter cells 171, the manifold 172 and the pipe 173 to the pump 165 and is discharged through the outlet 168, the valve 176 and the pipe 175 to the solids pit 150. From here the water flows through the screen 155 and back to the filter cells 171. Recirculation is continued until the necessary thickness of diatomaceous earth has been provided on the filter cells 171. At that time the valve 176 is closed and the valve 183 opened so as to resume normal circulation of water from the solids pit 150 through the screen 155, through the filter 170 and the pump 165 to the nozzles 180 and thus to the pool 101.

At certain times the water level 166 within the island 130 may tend to fall to such a low level that the recirculating pump 165 and the filter 170 do not operate properly. In order to assure an ample supply of water at all times, a main drain 190 has been provided in the bottom of the island 130 (see FIGS. 6, 7 and 9 particularly). There are four inlets 191 through the lower housing 131, pairs of the inlets 191 being associated with the two collecting pipes 192 which in turn connect to a manifold 193. Water flowing through the inlets 191, the collecting pipes 192 and the manifold 193 is then forced through a delivery pipe 194 that connects with the solids pit 150 through the gasket 154. The exist from the delivery pipe 194 is through a float valve 195 operated by a float 196, the outlet 197 being into the solids pit 150. When the level 166 within the island 130 falls so low that the float 196 opens the float valve 195, the difference in the hydrostatic head between the levels 126 and 166 causes a flow of water into the island 130 through the inlets 191 and via the collecting pipes 192, the manifold 193 and the delivery pipe 194 to the solids pit 150. Such a flow of water will continue until the level 166 rises so as to cause the float 196 to close the float valve 195.

Another important feature of the present invention is the provision of a chemical treatment of the water flowing through the island 130. To this end there has been provided a water treatment equipment room 200 (see FIGS. 3 and 5), the room 200 including a floor 201, upstanding walls 202 and a roof 203, all to provide protection for the contents of the room 200. Mounted within the room 200 is a detector-controller 205 for detecting and controlling the chlorine content and the pH of a water stream directed thereto. More specifically, an inlet pipe 206 communicates from the bottom of the island 130 to the detector-controller 205 where the chlorine content and pH are monitored. The flow then is to an outlet pipe 207 through a control valve 208, the outlet pipe 207 communicating with the interior of the island 130.

If the detector-controller 205 determines that additional chlorine is required, a suitable chlorine containing compound is then injected into the island 130. To this end a chlorine compound container 210 is provided, the container 210 having a meter 211 and a pipe 212 through which the compound in the container 210 can be fed to the interior of the island 130. Likewise, there is an acid container 215 in the equipment room 200, the container 215 being provided with the usual meter 216 and a pipe 217 also communicating with the island 130. In this manner, the chlorine content and the pH of the water within the island 130 can be continuously monitored and the necessary addition of chemicals made to maintain the chlorine content and the pH within predetermined values.

Also disposed within the equipment room 200 is the equipment for producing the diatomaceous earth slurry used to provide the filter aid on the filter cells 171. More specifically, there has been provided a make-up tank 221 provided with the usual stirrer 222 and a meter 223 having an inlet line 224 and an outlet line 225 communicating with the outlet pipe 207. When it is desired to renew the layer of filter aid on the filter cells 171, a quantity of diatomaceous earth is added to the tank 221, and sufficient water added so as to provide the desired consistency of the slurry, the stirrer 222 being utilized thoroughly to mix the diatomaceous earth in the water. The valve 208 is then closed so that water from the island 130 is pumped through the meter 223 to pick up the diatomaceous earth slurry and deliver it to the outlet line 225 and the outlet pipe 207 to the island 130. It will be understood that at this time the valve 183 is closed and the valve 176 is open. As a consequence, the diatomaceous earth slurry delivered to the island 130 will be continuously recirculated therein to build up on the vacuum filter cells 171 the desired thickness of coating of filter aid in the form of diatomaceous earth. When the desired coating on the filter cells 171 is achieved, the valve 208 is opened, the valve 183 is opened, and the valve 176 is closed. The parts are then in condition for the normal filtering and treatment operation within the island 130.

The material filtered from the water by the filter 170 will gradually fall to the bottom of the island 130 and is removed therefrom by the pump 157 through a pipe 178 connecting thereto (see FIG. 8).

The method of use and the operation of the aquatic exercise facility 100 will now be given with reference to the drawings. Although the facility 100 is useful with almost all types of animals, it has particular utility when applied to the exercise of horses, and the following description will be in conjunction with the exercise of horses in the facility 100. When the facility 100 is designed for use in the exercise of horses, the diameter of the pool 101 is approximately 50 feet, the diameter of the island 130 is approximately 10 feet, and the depth of the water at the outer edge of the bottom wall 103 is about 8 feet. Therefore, there is a distance of about 20 feet between the side wall 104 of the pool 101 and the island 130.

The circulating pump 165 is energized and the water treatment apparatus within the equipment room 200 is placed in condition for operation. A layer of diatomaceous earth is first applied to the surfaces of the filter cells 171 by preparing a slurry in the tank 221, after which the valves 208 and 183 are closed and the valve 176 opened. The diatomaceous earth slurry is then pumped into the island 130 and recirculated therein by means of the pump 165 from the solids pit 150 through the screen 155 and thence through the filter cells 171 and back to the pump 165. After the appropriate layer of diatomaceous earth has been applied to the surfaces of the filter cells 171, the valves 208 and 183 are opened and the valve 176 is closed. Filtered water is now ejected through the jets 180 radially outwardly from the island 130 and upwardly along the bottom of the wall 103 and upwardly along the side walls 104 and back across the top of the pool 101 to enter into the skimmer openings 138 and thence through the skimmer gutter 145 to the solids pit 150. The water then flows through the screen 155 which retains within the solids pit 150 all particles having a size greater than about 20 thousandths inch. The water flowing through the screen 155 enters the filtering area 160 and is then filtered by the vacuum filter 170 and returns to the pump 165 from which it is ejected through the jets 180 back into the pool 101.

With the island 130 and the water recirculation and filtering system operating as described, the trainer leads a horse down the entry ramp 111 in the direction of the arrows 114 and thus into the pool 101. Prior to entering the horse into the pool 101, the trainer extends the ramp 120 to the island 130 so the trainer can move onto the island 130 after which he returns the ramp 120 to its retracted position. The trainer standing on the footwalk 141 of the island 130 then guides the horse around the pool 101 and permits the horse to exercise as much as the trainer's judgment determines. At that time the ramp 120 is again extended to the island 130 and the trainer walks across the ramp 120 and up the support tracks 122 leading the horse onto the exit ramp 116. More specifically, the horse first encounters the steps 125 which assist the horse in gaining footage upon the exit ramp 116, after which the horse moves up the exit ramp 116 and onto the deck 106. It will be noted that when the horse is using the entry ramp 111 it is guided by the railings 113, and when the horse is using the exit ramp 116, it is guided by the railings 118. The trainer does not have to be present in either the entry ramp 111 or the exit ramp 116, but rather is to the side thereof.

It is pointed out that the pool 101 is of sufficient depth that the horse must swim and thus exercise in swimming around the island 130 in the pool 101. Several of the features of the facility 100 serve to ensure the safety and well being of the horse during the use thereof. The gently inclined entry ramp 111 ensures that the horse is gradually admitted into the pool 101 without panic. The handler is in control of the horse at all times moving along the space between the adjacent railings 113-118 and then onto the ramp 120 and thence to the island 130, and specifically the footwalk 141 thereof. The horse in exercising sees the space between the abutment 105 on the pool side wall 104 and the outwardly extending flange 137 and the associated cover 140 around the upper end of the island 130. As a consequence, the lower legs and hoofs are well away from the pool side wall 104 and the island housing 135. The steps 125 at the inlet portion of the ramp 116 materially assist the horse in gaining a firm foothold upon the exit ramp 116.

One of the important features of the present invention is the continual recirculation, filtration and treatment of the water within the pool 101, the treatment being effected within the island 130. Any fecal material excreted by the horses during exercise will be swept by the current toward the island 130 and into the skimmer openings 138 and thus into the solids pit 150 via the skimmer gutter 145. Any other debris falling into the pool 101 will likewise be swept by thus current into the solids pit 150 in the island 130. All solids having a size greater than 20 thousandths inch are retained within the solids pit 150 and the water passing through the screen 155 is further filtered by the vacuum filter 170 and material is removed therefrom down to a particle size of about one ten thousandth inch. The filtered water is then returned by means of the jets 180 to the pool 101, the return being along the upwardly sloping bottom wall 103 and along the vertical side wall 104 and then back to the island 130.

Not only is the water filtered within the island 130, but by means of the equipment in the equipment room 200, the chlorine content and the pH thereof are maintained within predetermined values at all times. This serves as a health advantage to both the horses utilizing the pool 101 and the handlers that control the horses during exercise thereof.

It will be appreciated that periodically the diatomaceous earth filter aid on the filter cells 171 is back flushed and removed, the diatomaceous earth and any materials filtered thereby dropping to the bottom of the island 130. At this time the circulating pump 165 is stopped and the pump 157 is actuated so as to withdraw the solids from the solids pit 150 and from the bottom of the island 130. After the solids waste has been removed by the pump 157, a new diatomaceous earth slurry is prepared in the equipment room 200 and is then pumped into the island 130. The diatomaceous earth is then applied to the surfaces of the filter cells 171 as described heretofore.

In a modification of the present invention, all of the equipment disposed in the equipment room 200 is disposed upon the cover 140 of the island 130. This is diagrammatically illustrated in FIGS. 2, 6 and 7 by the dashed lines showing wherein an equipment housing designated by the numeral 300. Because of the size of the island 130, the various water treatment and diatomaceous earth slurry equipment can be mounted on the cover 140 and still leave a sufficient walkway or footwalk 141 therearound so that the trainer can control the horses during the use of the pool 101.

In yet another form of the invention, all of the island 130 and the equipment therein is formed as a self-contained unit. This self-contained unit also may include the chlorine supply, the acid supply, the detector-controller 205 and the diatomaceous earth slurry equipment mounted thereon in the housing 300. Such a self-contained island 130 can be installed in an existing exercise pool without any substantial modification thereof, the only connection required being an electrical connection to operate the pumps and the detector-controller 205 in the island 130 and the equipment room 300 thereon. In this manner, existing exercise pools can be readily converted to incorporate therein the important advantages of the present invention.

While there have been described what are at present considered to be the preferred embodiments of the invention, it will be understood that various changes and modifications may be made therein without departing from the spirit and scope thereof, and it is intended to cover in the appended claims all such modifications as fall within the spirit and scope of the invention.

What is claimed is:

1. An aquatic exercise facility for animals comprising a container for a pool of water having an animal entry area and an animal exit area, a hollow island mounted in said container generally centrally with respect to said pool of water and extending upwardly therefrom, at least a portion of said pool around said island having a depth sufficient to require an animal to swim therein from said animal entry area to said animal exit area, whereby an animal entering said pool at said animal entry area must swim at least part way around said island across said deep portion and to said exit area thus to exercise the animal, means mounted within said island for establishing a current of water flowing from the upper portion of said pool of water into the upper end of said island and from the lower end of said island and back into the lower portion of said pool of water, and water filtering mechanism in said island for filtering the current of water flowing through said island thus to clean the water in said pool of water.

2. The aquatic exercise facility set forth in claim 1, wherein said container is essentially formed of concrete.

3. The aquatic exercise facility set forth in claim 1, wherein said container is essentially formed of stainless steel.

4. The aquatic exercise facility set forth in claim 1, wherein said animal entry area and said animal exit area are disposed adjacent to one another, whereby an animal entering at said animal entry area swims in said pool of water around said island and back to said animal exit area.

5. The aquatic exercise facility set forth in claim 1, wherein said animal entry area and said animal exit area include inclined ramps leading respectively into and out of said pool of water.

6. The aquatic exercise facility set forth in claim 1, wherein said animal exit area includes steps in at least a portion thereof adjacent to said pool to assist said animal in climbing onto said animal exit area.

7. The aquatic exercise facility set forth in claim 1, wherein said container and said island have peripheries extending therearound, and further comprising abutments along both the periphery of said container and the periphery of said island, said abutments extending inwardly adjacent to a predetermined water level in said pool for engaging the bodies of the animals and thus to maintain the legs of the animals at a safe distance from the walls of said container and said island.

8. The aquatic exercise facility set forth in claim 1, wherein said means for establishing a current of water is a pump disposed in said island.

9. The aquatic exercise facility set forth in claim 1, wherein said island has a footwalk for use by an animal trainer when an animal is in the pool.

10. The aquatic exercise facility set forth in claim 1, wherein said island is formed of metal.

11. The aquatic exercise facility set forth in claim 1, wherein said water filtering mechanism includes skimming weirs in said island feeding water from the surface of said pool to a screen within said island to strain large waste particles from the current of water flowing into said island.

12. The aquatic exercise facility set forth in claim 1, wherein said water filtering mechanism includes a vacuum filter mounted within said island.

13. The aquatic exercise facility set forth in claim 12, wherein said vacuum filter is of the diatomaceous earth type.

14. An aquatic exercise facility for animals comprising a container for a pool of water having an animal entry area and an animal exit area, a hollow island mounted in said container generally centrally with respect to said pool of water and extending upwardly therefrom, at least a portion of said pool around said island having a depth sufficient to require an animal to swim therein from said animal entry area to said animal exit area, whereby an animal entering said pool at said animal entry area must swim at least part way around said island across said deep portion and to said exit area thus to exercise the animal, a ramp mounted adjacent to said pool of water and extendable between the outer edge of said container and said island, means mounted within said island for establishing a current of water flowing from the upper portion of said pool of water into the upper end of said island and from the lower end of said island and back into the lower portion of said pool of water, and water filtering mechanism in said island for filtering the current of water flowing through said island thus to clean the water in said pool of water.

15. The aquatic exercise facility set forth in claim 14, wherein said ramp is mounted between said animal entry area and said animal exit area.

16. The aquatic exercise facility set forth in claim 14, wherein said ramp is mounted in cantilever fashion from the edge of said container and is roller supported for movement between an extended position overlying said island and a retracted position spaced from said island.

17. An aquatic exercise facility for animals comprising a container for a pool of water having an animal entry area and an animal exit area, a hollow island mounted in said container generally centrally with respect to said pool of water and extending upwardly therefrom, at least a portion of said pool around said island having a depth sufficient to require an animal to swim therein from said animal entry area to said animal exit area, whereby an animal entering said pool at said animal entry area must swim at least part way around said island across said deep portion and to said exit area thus to exercise the animal, means for establishing a current of water flowing from said pool of water into said island and from said island and back into said pool of water, water filtering mechanism in said island for filtering the current of water flowing through said island thus to clean the water in said pool of water, and water treatment mechanism for treating the water flowing through said island to maintain the chlorine content and the pH thereof within predetermined limits.

18. The aquatic exercise facility set forth in claim 17, wherein said water treatment mechanism includes a detector-controller for chlorine content and pH, a chlorine treatment mechanism, and a pH adjusting mechanism.

19. The aquatic exercise facility set forth in claim 17, wherein said water treatment mechanism is mounted on said island.

20. The aquatic exercise facility set forth in claim 17, wherein said water treatment mechanism is mounted at a remote point from said island and is connected thereto by piping.

21. The aquatic exercise facility set forth in claim 17, and further comprising a diatomaceous earth slurry system mounted on said island for servicing said water filtering mechanism.

22. The aquatic exercise facility set forth in claim 17, and further comprising a diatomaceous earth slurry facility mounted at a remote location with respect to said island and connected thereto by piping.

23. An aquatic exercise facility for animals comprising a container for a pool of water having an animal entry area and an animal exit area, a hollow island mounted in said container generally centrally with respect to said pool of water and extending upwardly therefrom, at least a portion of said pool around said island having a depth sufficient to require an animal to swim therein from said animal entry area to said animal exit area, whereby an animal entering said pool at said animal entry area must swim at least part way around said island across said deep portion and to said exit area thus to exercise the animal, a filtering area in said island and a solids pit in said island adjacent to the upper portion thereof and a screen disposed therebetween, a skimming gutter mounted adjacent to the upper end of said island and having an inlet communicating with the surface of said pool of water and an outlet communicating with said solids pit, means for establishing a current of water flowing from said pool of water through said solids pit and said filtering area and back into said pool of water through the lower portion of said island, and water filtering mechanism in said filtering area for filtering the current of water flowing therethrough thus to clean the water in said pool of water.

24. The aquatic exercise facility set forth in claim 23, wherein said screen is removable for cleaning.

25. The aquatic exercise facility set forth in claim 23, wherein the inlet to said skimming gutter is a plurality of openings in the wall of said island at essentially the water level in said pool of water.

26. The aquatic exercise facility set forth in claim 23, and further comprising means for pumping solids from said solids pit to waste disposal.

27. The aquatic exercise facility set forth in claim 23, wherein the outlet for water through the lower portion of said island is a plurality of jets spaced circumferentially therearound.

28. The aquatic exercise facility set forth in claim 27, wherein each of said jets is adjustable as to the direction of discharge thereof.

29. An aquatic exercise facility for animals comprising a container for a pool of water having an animal entry area and an animal exit area, a hollow island mounted in said container generally centrally with respect to said pool of water and extending upwardly therefrom, at least a portion of said pool around said island having a depth sufficient to require an animal to swim therein from said animal entry area to said animal exit area, whereby an animal entering said pool at said animal entry area must swim at least part way around said island across said deep portion and to said exit area thus to exercise the animal, a filtering area in said island and a solids pit in said island adjacent to the upper portion thereof and a screen disposed therebetween, a skimming gutter mounted adjacent to the upper end of said island and having an inlet communicating with the surface of said pool of water and an outlet communicating with said solids pit, means for establishing a current of water flowing from said pool of water through said solids pit and said filtering area and back into said pool of water through the lower portion of said island, water filtering mechanism in said filtering area for filtering the current of water flowing therethrough thus to clean the water in said pool of water, and a main drain in the lower portion of said island communicating with openings therein to draw water from said pool of water and upwardly to said solids pit when the water level within said island falls to a predetermined level.

30. The aquatic exercise facility set forth in claim 29, wherein a plurality of said openings is provided in the lower portion of said island for communication with said main drain, said openings being circumferentially spaced around the island.

31. The aquatic exercise facility set forth in claim 29, and further comprising a float controlled valve disposed in said main drain between the openings in said island and said solids pit.

32. The aquatic exercise facility set forth in claim 29, wherein the outlets for filtered water from said island are disposed above the openings to said main drain and are circumferentially spaced with respect thereto.

33. An aquatic exercise facility for animals comprising a container for a pool of water having an animal entry area and an animal exit area, a hollow island mounted in said container generally centrally with respect to said pool of water and extending upwardly therefrom, at least a portion of said pool around said island having a depth sufficient to require an animal to swim therein from said animal entry area to said animal exit area, whereby an animal entering said pool at said animal entry area must swim at least part way around said island across said deep portion and to said exit area thus to exercise the animal, a filtering area in said island and a solids pit in said island adjacent to the upper portion thereof and a screen disposed therebetween, a skimming gutter mounted adjacent to the upper end of said island and having an inlet communicating with the surface of said pool of water and an outlet communicating with said solids pit, means for establishing a current of water flowing from said pool of water through said solids pit and said filtering area and back into said pool of water through the lower portion of said island, water filtering mechanism in said filtering area for filtering the current of water flowing therethrough thus to clean the water in said pool of water, water treatment mechanism for treating the water flowing through said island to maintain the chlorine content and the pH thereof within predetermined limits, and a main drain in the lower portion of said island communicating with openings therein to draw water from said pool of water and upwardly to said solids pit when the water level within said island falls to a predetermined level.

34. The aquatic exercise facility set forth in claim 33, wherein said water treatment mechanism includes a detector-controller for chlorine content and pH, a chlorine treatment mechanism, and a pH adjusting mechanism.

35. The aquatic exercise facility set forth in claim 33, wherein said water treatment mechanism is mounted on said island.

36. The aquatic exercise facility set forth in claim 33, wherein said water treatment mechanism is mounted at a remote point from said island and is connected thereto by piping.

37. The aquatic exercise facility set forth in claim 33, and further comprising a diatomaceous earth slurry system mounted on said island for servicing said water filtering mechanism.

38. The aquatic exercise facility set forth in claim 33, and further comprising a diatomaceous earth slurry facility mounted at a remote location with respect to said island and connected thereto by piping.

39. A self-contained island for mounting in a pool of water in an aquatic exercise facility for animals, said island comprising a hollow housing for mounting in the associated pool of water and extending upwardly therefrom, means mounted within said housing for establishing a current of water flowing from the upper portion of the associated pool of water into the upper portion of said housing and from the lower end of said housing and back into the lower portion of the associated pool of water, and water filtering mechanism in said housing for filtering the current of water flowing through said island thus to clean the water in the associated pool of water.

40. The self-contained island set forth in claim 39, and further comprising an abutment around the periphery of said housing extending inwardly adjacent to the water level in the associated pool for engaging the bodies of the animals and thus to maintain the legs of the animals at a safe distance from said housing.

41. The self-contained island set forth in claim 39, wherein said means for establishing a current of water is a pump disposed in said housing.

42. The self-contained island set forth in claim 39, wherein said housing has a footwalk for use by an animal trainer when an animal is in the pool.

43. The self-contained island set forth in claim 39, wherein said housing is formed of metal.

44. The self-contained island set forth in claim 39, wherein said water filtering mechanism includes skimming weirs in said housing feeding water from the surface of the associated pool to a screen within said housing to strain large waste particles from the current of water flowing into said housing.

45. The self-contained island set forth in claim 39, wherein said water filtering mechanism includes a vacuum filter mounted within said housing.

46. The self-contained island set forth in claim 45, wherein said vacuum filter is of the diatomaceous earth type.

47. A self-contained island for mounting in a pool of water in an aquatic exercise facility for animals, said island comprising a hollow housing for mounting in the associated pool of water and extending upwardly therefrom, means mounted within said housing for establishing a current of water flowing from the upper portion of the associated pool of water into the upper portion of said housing and from the lower end of said housing and back into the lower portion of the associated pool of water, water filtering mechanism in said housing for filtering the current of water flowing through said island thus to clean the water in the associated pool of water, and water treatment mechanism mounted on said housing for treating the water flowing through said island to maintain the chlorine content and the pH thereof within predetermined limits.

48. A self-contained island for mounting in a pool of water in an aquatic exercise facility for animals, said island comprising a hollow housing for mounting in the associated pool of water and extending upwardly therefrom, means for establishing a current of water flowing from the associated pool of water into said housing and from said housing and back into the associated pool of water, water filtering mechanism in said housing for filtering the current of water flowing through said island thus to clean the water in the associated pool of water, and water treatment mechanism mounted on said housing for treating the water flowing through said island including a detector-controller for chlorine content and pH, a chlorine treatment mechanism, and a pH adjusting mechanism.

49. The self-contained island set forth in claim 47, and further comprising a diatomaceous earth slurry system mounted on said housing for servicing said water filtering mechanism.

50. A self-contained island for mounting in a pool of water in an aquatic exercise facility for animals, said island comprising a hollow housing for mounting in the associated pool of water and extending upwardly therefrom, a filtering area in said housing and a solids pit in said housing adjacent the upper portion thereof and a screen disposed therebetween, a skimming gutter mounted adjacent to the upper end of said housing and having an inlet communicating with the surface of the associated pool of water and an outlet communicating with said solids pit, means for establishing a current of water flowing from the associated pool of water through said solids pit and said filtering area and back into the associated pool of water through the lower portion of said housing, and water filtering mechanism in said filtering area for filtering the current of water flowing therethrough thus to clean the water in the associated pool of water.

51. The self-contained island set forth in claim 50, wherein said screen is removable for cleaning.

52. The self-contained island set forth in claim 50, wherein the inlet to said skimming gutter is a plurality of openings in said housing at essentially the water level in the associated pool of water.

53. The self-contained island set forth in claim 50, and further comprising means for pumping solids from said solids pit to waste disposal.

54. The self-contained island set forth in claim 50, wherein the outlet for water to the lower portion of said housing is a plurality of jets spaced circumferentially therearound.

55. The self-contained island set forth in claim 54, wherein each of said jets is adjustable as to the direction of discharge thereof.

56. A self-contained island for mounting in a pool of water in an aquatic exercise facility for animals, said island comprising a hollow housing for mounting in the associated pool of water and extending upwardly therefrom, a filtering area in said housing and a solids pit in said housing adjacent the upper portion thereof and a screen disposed therebetween, a skimming gutter mounted adjacent to the upper end of said housing and having an inlet communicating with the surface of the associated pool of water and an outlet communicating with said solids pit, means for establishing a current of water flowing from the associated pool of water through said solids pit and said filtering area and back into the associated pool of water through the lower portion of said housing, water filtering mechanism in said filtering area for filtering the current of water flowing therethrough thus to clean the water in the associated pool of water, and a main drain in the lower portion of said housing communicating with openings therein to draw water from the associated pool of water and upwardly to said solids pit when the water level within said housing falls to a predetermined level.

57. The self-contained island set forth in claim 56, wherein a plurality of said openings is provided in the lower portion of said housing for communication with said main drain, said openings being circumferentially spaced around said housing.

58. The self-contained island set forth in claim 56, and further comprising a float controlled valve disposed in said main drain between the openings in said housing and said solids pit.

59. The self-contained island set forth in claim 56, wherein the outlets for filtered water from said housing are disposed above the openings to said main drain and are circumferentially spaced with respect thereto.

60. A self-contained island for mounting in a pool of water in an aquatic exercise facility for animals, said island comprising a hollow housing for mounting in the associated pool of water and extending upwardly therefrom, a filtering area in said housing and a solids pit in said housing adjacent the upper portion thereof and a screen disposed therebetween, a skimming gutter mounted adjacent to the upper end of said housing and having an inlet communicating with the surface of the associated pool of water and an outlet communicating with said solids pit, means for establishing a current of water flowing from the associated pool of water through said solids pit and said filtering area and back into the associated pool of water through the lower portion of said housing, water filtering mechanism in said filtering area for filtering the current of water flowing therethrough thus to clean the water in the associated pool of water, water treatment mechanism on said housing for treating the water flowing through said island to maintain the chlorine content and the pH thereof within predetermined limits, and a main drain in the lower portion of said housing communicating with openings therein to draw water from the associated pool of water and upwardly to said solids pit when the water level within said housing falls to a predetermined level.

61. The self-contained island set forth in claim 60, wherein said water treatment mechanism includes a detector-controller for chlorine content and pH, a chlorine tratment mechanism, and a pH adjusting mechanism.

62. The self-contained island set forth in claim 60, and further comprising a diatomaceous earth slurry system mounted on said housing for servicing said water filtering mechanism.

* * * * *